*F. Root,*

*Curtain Fixture.*

No. 108,190. Patented Oct. 11, 1870.

Witnesses.
Wm. Ed. Simonek
E. Henry Hyde, Jr.

Inventor.
Franklin Root

United States Patent Office.

FRANKLIN ROOT, OF HARTFORD, CONNECTICUT.

Letters Patent No. 108,190, dated October 11, 1870; antedated September 30, 1870.

IMPROVEMENT IN CURTAIN-FIXTURES.

The Schedule referred to in these Letters Patent and making part of the same.

I, FRANKLIN ROOT, of Hartford, county of Hartford and State of Connecticut, have invented certain Improvements in Curtain-Fixtures, of which the following is a specification.

Nature and Objects of the Invention.

The fixture to which my improvements apply is of the kind that has an adjustable roll, which, bearing the curtain, is moved up and down the length of the window.

One of the features of my improvement is a new device for doing away with the fixed roll at the top of the window, which is sometimes used, as, for instance, in a former application for a patent of my own.

Another feature of my improvement is a new device for keeping an endless cord taut, such cords being often used in curtain-fixtures of various kinds.

Description of the Accompanying Drawing.

Like letters always refer to like parts.

Figure 1:
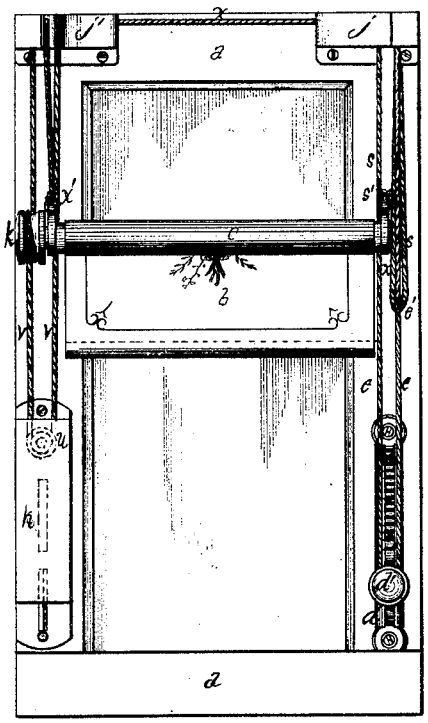
Figure 1 is a front view of a window, with a curtain and my improvements attached.
Figure 3:
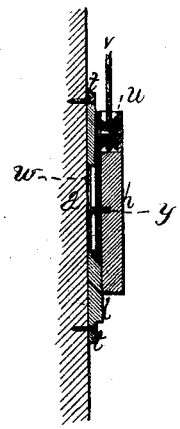
Figure 3 is a detached sectional view of the device for keeping an endless cord taut, the section being central, vertical, and longitudinal.
Figure 2:
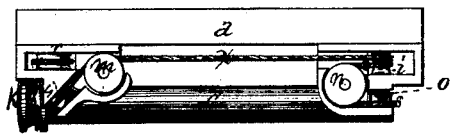
Figure 2 is a top view of the same.

General Description.

The letter $a$ indicates the frame of the window.

The letter $b$, the curtain, rolling upon the adjustable roll $c$.

The letter $d$ is a common device for keeping the cord $e$ taut.

This cord $e$ is simply an endless cord, running around the button $d'$ and the pulley $i$.

To this cord $e$ are attached, at the point $e'$, two other cords, $s$ and $x$.

The cord $s$ runs up over the pulley $i$, around the pulley $n$, over the pulley $o$, and down to $s'$, where a hanging bearing, attached to the end of the cord $s$, supports one end of the roll $c$.

The other cord, $x$, also runs up over the pulley $i$, across the top of the window, around the pulley $m$, over the pulley $z$, and down to $x'$, where it supports, by a hanging bearing, the other end of the roll $c$.

Now, if a person takes hold of the cord $e$ at the knot $e'$, and pulls down, the roll $c$, and the curtain with it, will be raised, and, of course, by pulling up on the knot $e'$ the roll will be lowered.

The cord $v$ is also an endless cord, running over the pulley $r$ at the top of the window, and over the pulley $u$, inside the weight $h$. It also takes a twist around the pulley $k$, fastened to the end of the roll $c$, so that, when the cord is pulled one way or the other, the curtain will be rolled on or off the roll $c$, as desired.

The weight $h$ is made of metal, and slides freely upon the flat piece $t$, which is screwed to the window-frame.

There is a slot, $w$, made lengthwise in the center of the width of the flat piece $t$, through which a screw, $y$, is driven into the weight $h$, thus securing the weight to the flat piece, and, at the same time, leaving it free to rise and fall in the direction of its length.

There is also a rib, $l$, raised on the lower part of the flat piece $t$, which fits to a corresponding groove in the under side of the weight, thus always keeping the weight in a vertical line.

The pulleys $i$, $o$, and $n$, are all fixed in a metal frame, $j$, which is screwed to the top of the window-frame.

The pulleys $m$, $r$, and $z$, are likewise fixed in the metal frame $j'$, which is also screwed to the top of the window-frame.

Claims.

I claim as my invention—

1. The metal frames $j$ and $j'$, constructed as herein described, and provided with the pulleys $i\ n\ o$ and $m\ k\ r$, as and for the purpose specified.

2. The weight $h$, containing the pulley $u$, in combination with the flat piece $t$, and attached to the same, in the manner and for the purpose set forth.

Signed this 15th day of March, 1870.

FRANKLIN ROOT.

Witnesses:
WM. ED. SIMONDS,
E. HENRY HYDE, Jr.